UNITED STATES PATENT OFFICE.

MORGAN W. BROWN, OF BROOKLYN, NEW YORK.

COMPOSITION OF MATTER.

SPECIFICATION forming part of Letters Patent No. 247,797, dated October 4, 1881.

Application filed July 2, 1881. (No specimens.)

*To all whom it may concern:*

Be it known that I, MORGAN W. BROWN, of Brooklyn, in the county of Kings and State of New York, have invented a certain new and useful Composition of Matter, of which the following is a specification.

The object of my invention is to provide a composition of matter suitable for the treatment of paper, paper-fiber, or cloth fabric as a means for rendering the same flexible, tenacious, and resistant to wear, said composition being also adaptable to use in the manufacture of paper pads or tablets and to other useful purposes in the arts.

To this end my improvements consist in a process of manufacture and a composition hereinafter fully set forth.

The process of manufacture of my improved composition is as follows:

First. I take skin-glue or gelatine, which I soak in cold water for from one to three hours, then heat to the boiling-point, add commercial glycerine, (preferably white glycerine of specific gravity 29° to 30° Baumé,) and mix well together. The several ingredients should be in about the following proportions, to wit: one (1) pound skin-glue, four (4) to six (6) pounds cold water, one and one-eighth (1⅛) pounds glycerine.

Second. I mix, say, one-half (½) pound carbonate of lime (by preference best English paris-white) with sufficient warm water to form a thin pulp.

Third. I mix about one-quarter (¼) pound turkey-red or other earth paint with sufficient warm water to form a thin pulp.

Fourth. I mix the several compounds before enumerated thoroughly together and heat them to a temperature of 200° Fahrenheit or thereabout, for a period of, say, thirty minutes, after which I strain the compound while hot through a fine wire-gauze, and it is then, while in a liquid condition, ready for immediate use, or, if desired, may be allowed to solidify in cakes of convenient form and size and be preserved for future use, being unaffected by atmospheric action or ordinary temperatures and readily liquefiable at a heat of about 200° Fahrenheit.

Any desired color may be imparted to the compound by the admixture therewith of a proper coloring matter or pigment—as an aniline color, ultramarine-blue, lamp-black, &c. For example, to impart a red color in the preparation of the compound before described, there may be added thereto, prior to the final mixture of the several subordinate compounds, two or three table-spoonfuls of a solution of red aniline. The coloring operation is, however, obviously optional, and constitutes no essential part of my invention.

The composition, prepared as above specified, is applied to the fabrics to be treated in a liquid state. The application may be effected by means of a brush or roller, or by passing the paper through a bath of the composition, as in sizing and waterproofing operations, and, not constituting *per se* part of my present invention, need not be here specifically set forth.

Among various coatings for fabrics heretofore in use I specially disclaim one composed of dissolved glue, ferric chloride, glycerine, alum, and quercitannic acid, in whatever proportions mixed; as also one consisting of glue, mastic dextrine, glycerine, chloride of iron, chrome-alum, and a pigment, such compositions of matter not embodying my invention or having the properties thereof; but

I claim as my invention and desire to secure by Letters Patent—

1. The within-described process of preparing a composition of matter, the same consisting in the admixture and treatment of skin-glue or gelatine, water, glycerine, carbonate of lime, and earth paint, in the manner and for the purpose, substantially as set forth.

2. As a new article of manufacture, a composition of matter consisting of skin-glue or gelatine, water, glycerine, carbonate of lime, and earth paint, compounded in the proportions substantially as set forth.

MORGAN W. BROWN.

Witnesses:
J. SNOWDEN BELL,
GEO. T. KELLY.